US007116072B1

United States Patent
Murray et al.

(10) Patent No.: US 7,116,072 B1
(45) Date of Patent: Oct. 3, 2006

(54) MOTORIZED BARRIER OPERATOR SYSTEM FOR SETTING A DOWN FORCE ADJUSTMENT TO A MINIMUM VALUE AND METHOD FOR PROGRAMMING THE SAME

(75) Inventors: James S Murray, Milton, FL (US); Richard E Gagnon, Pensacola, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 0 days.

(21) Appl. No.: 10/875,410

(22) Filed: Jun. 24, 2004

(51) Int. Cl.
G05B 5/00 (2006.01)
G05D 3/00 (2006.01)
H02H 7/08 (2006.01)
H02P 1/04 (2006.01)
H02P 3/00 (2006.01)

(52) U.S. Cl. ............ 318/466; 318/280; 318/283; 318/432; 318/433; 318/434; 318/443; 318/444; 318/445; 318/469

(58) Field of Classification Search ........ 318/280–283, 318/432, 434, 443, 445, 466, 469; 49/26, 49/28
See application file for complete search history.

(56) References Cited

U.S. PATENT DOCUMENTS

| 4,597,428 | A | | 7/1986 | Iha .......................... 160/188 |
| 5,278,480 | A | * | 1/1994 | Murray ........................ 318/626 |
| 5,801,501 | A | * | 9/1998 | Redelberger ................ 318/283 |
| 5,929,580 | A | | 7/1999 | Mullet et al. ............... 318/466 |
| 5,977,732 | A | * | 11/1999 | Matsumoto ................. 318/283 |
| 6,034,497 | A | * | 3/2000 | Tamagawa et al. ......... 318/466 |
| 6,092,338 | A | * | 7/2000 | Crowner et al. .............. 49/360 |
| 6,326,751 | B1 | | 12/2001 | Mullet et al. ............... 318/434 |
| 6,696,806 | B1 | * | 2/2004 | Study et al. ................. 318/280 |
| 6,741,052 | B1 | * | 5/2004 | Fitzgibbon .................. 318/434 |
| 6,870,334 | B1 | * | 3/2005 | Jurado et al. ............... 318/282 |

* cited by examiner

Primary Examiner—Rina Duda
Assistant Examiner—Erick Glass
(74) Attorney, Agent, or Firm—Renner, Kenner, Greive, Bobak, Taylor & Weber

(57) ABSTRACT

A method and system for setting a downward force adjustment exerted by a barrier is disclosed. As is known, the barrier operator initiates corrective action if a detected obstruction force is deemed excessive. The inventive method and system comprises pre-setting a force threshold value used by the barrier operator. While in a programming mode, the barrier is moved from one limit position to another limit position. A recorded value is determined during the moving of the barrier and the threshold value is adjusted until equal the recorded value. A feedback device such as a light or a speaker is used to indicate when the threshold value is at least equal the recorded value.

13 Claims, 4 Drawing Sheets

MOTORIZED BARRIER OPERATOR SYSTEM FOR SETTING A DOWN FORCE ADJUSTMENT TO A MINIMUM VALUE AND METHOD FOR PROGRAMMING THE SAME

TECHNICAL FIELD

Generally, the present invention relates to a movable barrier operator system for use on a closure member moveable relative to a fixed member. More specifically, the present invention relates to a barrier operator, wherein the operator allows for manual setting of a down force adjustment to determine the minimum force needed to move the barrier.

BACKGROUND ART

For convenience purposes, it is well known to provide garage doors which utilize a motor to provide opening and closing movements of the door. Motors may also be coupled with other types of movable barriers such as gates, windows, retractable overhangs and the like. An operator is employed to control the motor and related functions with respect to the door. The operator receives command signals for the purpose of opening and closing the door from a wireless remote, from a wired or wireless wall station or other similar device. It is also known to provide safety devices that are connected to the operator for the purpose of detecting an obstruction so that the operator may then take corrective action with the motor to avoid entrapment of the obstruction.

How safety devices are used with a door operator system have evolved from the days of no uniform standard to the currently applied government regulations as embodied in Underwriters Laboratories Standard 325. UL Standard 325 encompasses safety standards for a variety of movable barriers such as gates, draperies, louvers, windows and doors. The standard specifically covers vehicular gate or door operators intended for use with garages and/or parking areas. Such devices require a primary safety system and a secondary safety system which are independent of each other. Primary entrapment systems sense the operator motor's current draw, or motor speed and take the appropriate corrective action if the monitored value is exceeded. Primary systems must be internal within the operator head. Secondary entrapment systems are typically external from the operator head and may include a non-contact or contact type sensor. But, secondary systems may also be internal to the operator head as long as they are independent of the primary system.

One of the more widely used non-contact devices is a photo-electric eye which projects a light beam across the door's travel path. If the light beam is interrupted during closure of the door, the operator stops and reverses the travel of the door. Contact type safety devices such as an edge-sensitive pressure switch, which is attached to the bottom edge of the door and runs the complete width of the door, may also be used. Other contact safety devices directly monitor the operating characteristics of the driving motor to determine whether an obstruction is present. Typically, shaft speed of the motor is monitored by projecting an infrared light through an interrupter wheel. Alternatively, Hall effect switches or tachometers can be used to monitor shaft speed. Or, the motor current could be monitored such that when an excessive amount of current is drawn by the motor—which indicates that the motor is working harder than normal—it is presumed that an obstruction has been encountered. It is also known to monitor door speed with a sliding potentiometer, wherein a rate of change is equated to the speed of the door and wherein unexpected slowing of the door triggers corrective action by the operator. The secondary entrapment requirement may also be met by providing an operator that is capable of receiving continuous pressure on an actuating device that is in the line of sight of the door and maintains the opening or closing motion until the respective limit position is reached. Regardless of how the safety devices work, their purpose is to ensure that individuals, especially children, are not entrapped by a closing door. Opening forces of the door are also monitored to preclude damage to the operating system for instances where an object or individual is caught upon a door panel as the door moves upwardly.

Prior art devices have either user access adjustment settings or internal automatic predetermined settings to set the force the operator-driven motor can exert on the barrier or door. User access settings can be set by cycling the door and testing the amount of force the door is exerting before it reverses. This repeated cycling may take some time and effort to adjust the setting properly for each weight and size door a particular type of operator is associated with. Without having an indicator to indicate when the door force setting is properly adjusted, many times the force is adjusted too high, for a number of reasons. For example, the settings may be adjusted too high to overcome environmental changes; or because of wear and changes to components such as the door, hinges between the door panels, the spring, the door track and so on. The setting may also be adjusted by untrained personnel and if no warranty maintenance is ever performed, the setting will likely be left at an exceedingly high and dangerous value. In any event, the door operates without a problem until something becomes entrapped under the door. As a result, when the unnecessarily high force is used, the entrapped object or the door, or both, are damaged. The automatic internal force adjustment solves these problems, but the units that incorporate this type of technology may not work with all weights and sizes of doors. Some attempts at solving the aforementioned problem are disclosed in the following U.S. Patents.

U.S. Pat. No. 4,597,428 to Iha discloses aworm drive with a cable and twin drums and helical gears which provide positive drive in either direction and ensures positive cable take-up and supply spool synchronization. Positive position relationship is ensured between the trolley and the operator head, and the ends of the cable are pre-assembled and anchored to the drive reels which allows easy assembly and disassembly. The cable is oriented in the vertical plane which allows the point of the cable latch to be in the same load/force plane and effectively minimizes the rail bowing under severe load conditions. The tubular rail can be broken into disassembled parts and can be easily and quickly reassembled for installation and a novel tension adjustment for the cables assures that the tension of the cable can be quickly and easily adjusted during installation. The up and down limits can be easily adjusted and the up and down force adjustments can be accurately and easily adjusted and merely require the setting of potentiometers which provides a positive and accurate way of adjusting the up and down force limits. But this configuration does not provide any type of user feedback. As such, the user is never quite sure if just the minimum force required to close the barrier is being used.

U.S. Pat. Nos. 5,929,580 and 6,326,751 to Mullet, et al. disclose an internal entrapment system for a garage door operator, comprising a motor for transferring a garage door between first and second positions, a pulse counter for detecting a speed of the garage door during transfer between first and second positions, a potentiometer for determining a plurality of positional locations of the garage door during transfer between first and second positions separate from the pulse counter, and a control circuit for calculating a motor torque value from the speed for each of the plurality of positional locations to compare with a plurality of door profile data points. The control circuit takes corrective action if the difference between the motor torque value for each of the plurality of positional locations and the plurality of door profile data points exceeds a predetermined threshold. And the control circuit updates the plurality of door profile data points to the motor torque values for each respective plurality of positional locations if the predetermined threshold is not exceeded. In another embodiment both speed and position are detected by a slider element which is connected to the control circuit. A closed loop lift cable system may be employed for use with the internal entrapment system. The system utilizes a lift cable connected between a bottom section of the door and a drum mechanism and an upper cable connected between a top section of the door and the drum mechanism. A tension device ensures that the door and cables act as one and thus allow closed loop control of the door. One of the objects of this embodiment is to provide an internal entrapment system to monitor door speed and applied force as the door travels in the opening and closing directions, wherein if the door encounters an obstacle during opening and closing, the door speed and applied force will change. Another object of the present invention is to stop and reverse or just stop travel of the door if predetermined thresholds in door speed and applied force are not met. Still another object of the present invention is to generate door profile data during an initial door open and close cycle and whereupon the door profile data and predetermined thresholds are updated after each cycle. The unit monitors the operational characteristics of the operator and determines the proper force adjustment in both the up and down directions compared to predetermine thresholds and will not allow user adjustment. The system requires many sensors and an extensive software program to function. But, this system is deficient in that it does not provide for any user feedback when setting the down force value used by the controller.

U.S. Pat. No. 5,278,480 to Murray discloses a garage door operator with a micro-computer based control which is programmed to measure door position from a full open position by counting motor revolutions and which determines motor speed and deceleration for each revolution. The program learns the open and close position limits and force sensitivity limits for up and down operation with supposedly minimal user input. The patent discloses that during normal door operation the closed limit and sensitivity limits are adaptively adjusted to accommodate changes and conditions. The lowest up and down motor speeds in each operation are stored for comparison with motor speeds in the next like operation for obstruction detection. For a more sensitive obstruction detection during closing, the motor speed is mapped for each revolution for the last several inches of closing. Although effective in its stated purpose, it is believed that an excessive amount of force may still be applied to an obstruction inasmuch as the force applied may still be more than required to actually close the door. Moreover, no user feedback mechanism is provided such that the user can determine what the minimum force setting is during a programming mode.

DISCLOSURE OF INVENTION

It is thus an object of the present invention to provide a motorized barrier operator system for setting a down force adjustment to a minimum value and method for programming the same.

In general, the present invention contemplates a method for setting a force adjustment on a barrier operator, wherein the barrier operator initiates corrective action if a detected obstruction force is deemed excessive, the method comprising pre-setting a threshold value used by the barrier operator; initiating a programming mode; moving the barrier from one limit position to another limit position while in said programming mode; determining a recorded value during the moving step; and adjusting said threshold value until equal said recorded value.

The invention also contemplates a barrier operator system that provides a force setting adjustment comprising a moveable barrier; a motor coupled to said moveable barrier, said motor moving said barrier between limit positions; a sensor associated with one of said moveable barrier and said motor to determine a recorded value of barrier movement; and an adjustment mechanism that allows adjustment of a threshold value until at least equal said recorded value.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
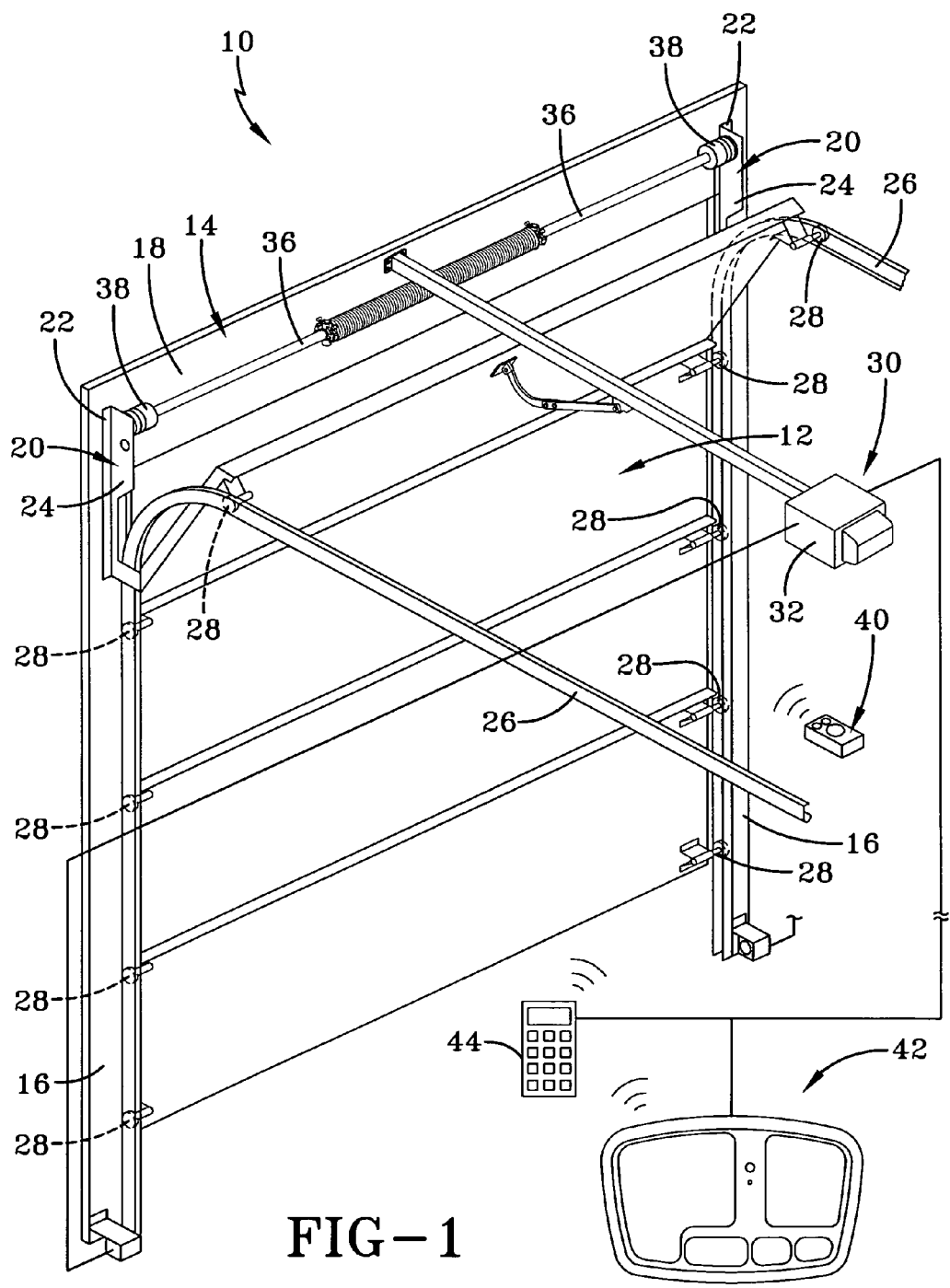
FIG. 1 is a fragmentary perspective view depicting a sectional garage door and showing an operating mechanism embodying the concepts of the present invention.

A motorized barrier operator adaptable to different safety configurations is generally indicated by the numeral 10 in FIG. 1 of the drawings. The system 10 is employed in conjunction with a conventional sectional garage barrier or door generally indicated by the numeral 12. The teachings of the present invention are equally applicable to other types of movable barriers such as single panel doors, gates, windows, retractable overhangs, and any device that at least partially encloses an area. The door 12 is most likely an anti-pinch type door. The opening in which the door is positioned for opening and closing movements relative thereto is surrounded by a frame, generally indicated by the numeral 14, which consists of a pair of a vertically spaced jamb members 16 that, as seen in FIG. 1, are generally parallel and extend vertically upwardly from the ground (not shown). The jambs 16 are spaced and joined at their vertically upper extremity by a header 18 to thereby form a generally u-shaped frame 14 around the opening for the door 12. The frame 14 is normally constructed of lumber or other structural building materials for the purpose of reinforcement and to facilitate the attachment of elements supporting and controlling the door 12.

Secured to the jambs 16 are L-shaped vertical members 20 which have a leg 22 attached to the jambs 16 and a projecting leg 24 which perpendicularly extends from respective legs 22. The L-shaped vertical members 20 may also be provided in other shapes depending upon the particular frame and garage door with which it is associated. Secured to each projecting leg 24 is a track 26 which extends perpendicularly from each projecting leg 24. Each track 26 receives a roller 28 which extends from the top edge of the garage door 12. Additional rollers 28 may also be provided on each top vertical edge of each section of the garage door to facilitate transfer between opening and closing positions.

Figure 2:
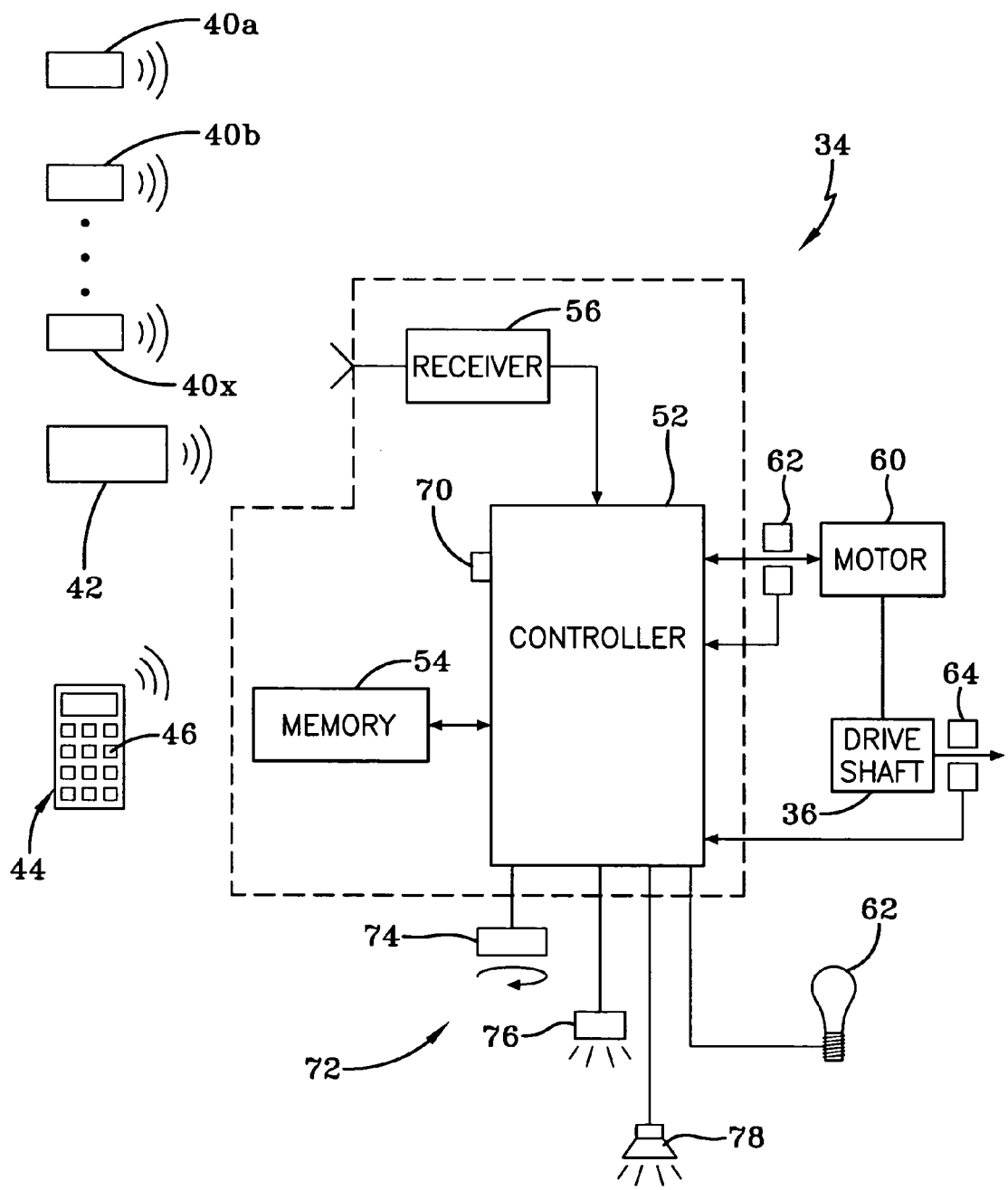
FIG. 2 is a schematic diagram of an operator mechanism.

A counterbalancing system generally indicated by the numeral 30 may be employed to move the garage door 12 back and forth between opening and closing positions. One example of a counterbalancing system is disclosed in U.S. Pat. No. 5,419,010, which is incorporated herein by reference. In the preferred embodiment, the counterbalancing system employs a rail or trolley type operator that is suspended from the ceiling of the enclosure or otherwise supported. The system 30 includes a housing 32, which is suspended from the ceiling, from which extends a drive train 33. The housing 32 contains an operator mechanism generally indicated by the numeral 34 as seen in FIG. 2. A trolley arm 35 extends between the drive train 33 and a top section or top panel of the door. A motor 60 contained withing the housing moves the drive train so as to move the door in a corresponding manner. A drive shaft 36 is rotatably mounted to the header 18, the opposite ends of which are received by tensioning assemblies 38 that are affixed to respective projecting legs 24. Coupled to the drive shaft 36 are counterbalance springs that assist in movement of the door between positions. Although a trolley operator is specifically discussed herein, the control features to be discussed later are equally applicable to other types of operators used with movable barriers. This includes, but is not limited to, header-mounted, jackshaft, screw-type or other operators.

In order to move the door from an open position to a closed position or vice versa, a remote transmitter 40, a wall station transmitter 42 or a keyless entry pad transmitter 44 may be actuated. The remote transmitter 40 may use infrared, acoustic or radio frequency signals that are received by the operator mechanism to initiate movement of the door. Likewise, the wall station 42 may perform the same functions as the remote transmitter 40 and also provide additional functions such as the illumination of lights and provide other programming functions to control the manner in which the barrier is controlled. The wall station 42 may either be connected directly to the operator mechanism 34 by a wire or it may employ radio frequency or infrared signals to communicate with the operator mechanism 34. The wall station is preferably positioned within the line of sight of the barrier as it moves between positions. A hands-free transmitter may also be incorporated into the system 10.

Referring now to FIG. 2, it can be seen that the operator mechanism 34 employs a controller 52 which receives power from batteries or some other appropriate power supply. The controller 52 includes the necessary hardware, software, and a non-volatile memory device 54 to implement operation of the operator and its related features. It will be appreciated that the memory device 54 may be integrally maintained within the controller 52. When any of the transmitters are actuated, a receiver 56 receives the signal and converts it into a form useable by the controller 52. If a valid signal is received by the controller, it initiates movement of the motor 60 which, in turn, generates movement of the drive train 33 and the door is driven in the appropriate direction. It will be appreciated that various type of safety sensors may be incorporated into the operator mechanism such as photo-electric eyes, so as to immediately take corrective action if a potential obstruction is detected during downward movement of the door.

The controller may be associated with various sensors which monitor the operation of the motor, the drive shaft and the movable barrier. In particular, it is noted that an optical encoder, a potentiometer or other sensing device which can monitor rotational movement and the speed of the various components within the motor, drive shaft and/or the door may provide input to the controller. For example, a current sensor 62 may be associated with the motor so as to monitor current draw by the motor wherein an increase in current may indicate that the motor has encountered an obstruction. An optical encoder 64 may be coupled to the drive shaft 36 so as to detect rotational speed of the drive shaft. Other magnetic sensors such as a Hall effect device may be coupled to the drive shaft and/or the motor so as to provide the appropriate input to the controller. It will thus be appreciated that the controller 52 may make measurements of the door speed about every ten to twenty milliseconds or by other time periods as deemed appropriate. These door speed measurements may then be used by the controller to determine a force value that is present at the leading edge of the movable barrier.

A program button 70 is associated with the controller 52 and actuation thereof places the controller in a programming mode. During this programming mode the operator may set travel limits for the movable barrier such that the door always moves between a set closed position, which is typically the floor of the enclosure, and an open limit position which allows a maximum opening into the enclosed area defined by the moveable barrier. The programming mode may also be entered by actuation of selected buttons on any of the transmitters. The operator mechanism 34 is preferably provided with user-adjustable position potentiometers for the purpose of setting the open and close limits. In order to set the limits, the trolley arm, detached from the door, is moved to a predetermined position that will likely close the door. The arm is then attached to the door and the close position is tested. If a gap between the bottom of the door and the garage floor is detected or the door automatically reverses direction upon closing, the close potentiometer is adjusted accordingly. The door is then disconnected from the operator and manually moved to determine the door's "natural" fully open position and this position is marked. The door is then reconnected to the operator and opened. The open potentiometer is then adjusted so that the door opens to the "natural" open position.

An adjust mechanism 72 is also associated with the controller 52 for the purpose of determining the minimal downward force needed to move the barrier from an open position to a closed position. The adjust mechanism 72 includes a force adjustment potentiometer 74 connected to the controller 52. Also incorporated as part of the adjust mechanism may be a light 76 or an audio speaker 78. The light 76 or the speaker 78 provide an indication to the user as to whether the force setting is acceptable or not. In other words, use of the light or the speaker assists in providing feedback to the installer of a proper setting for a downward force exerted by the barrier during a closing operation. Of course, a similar setting of a minimum upward force could be made.

Figure 3A:
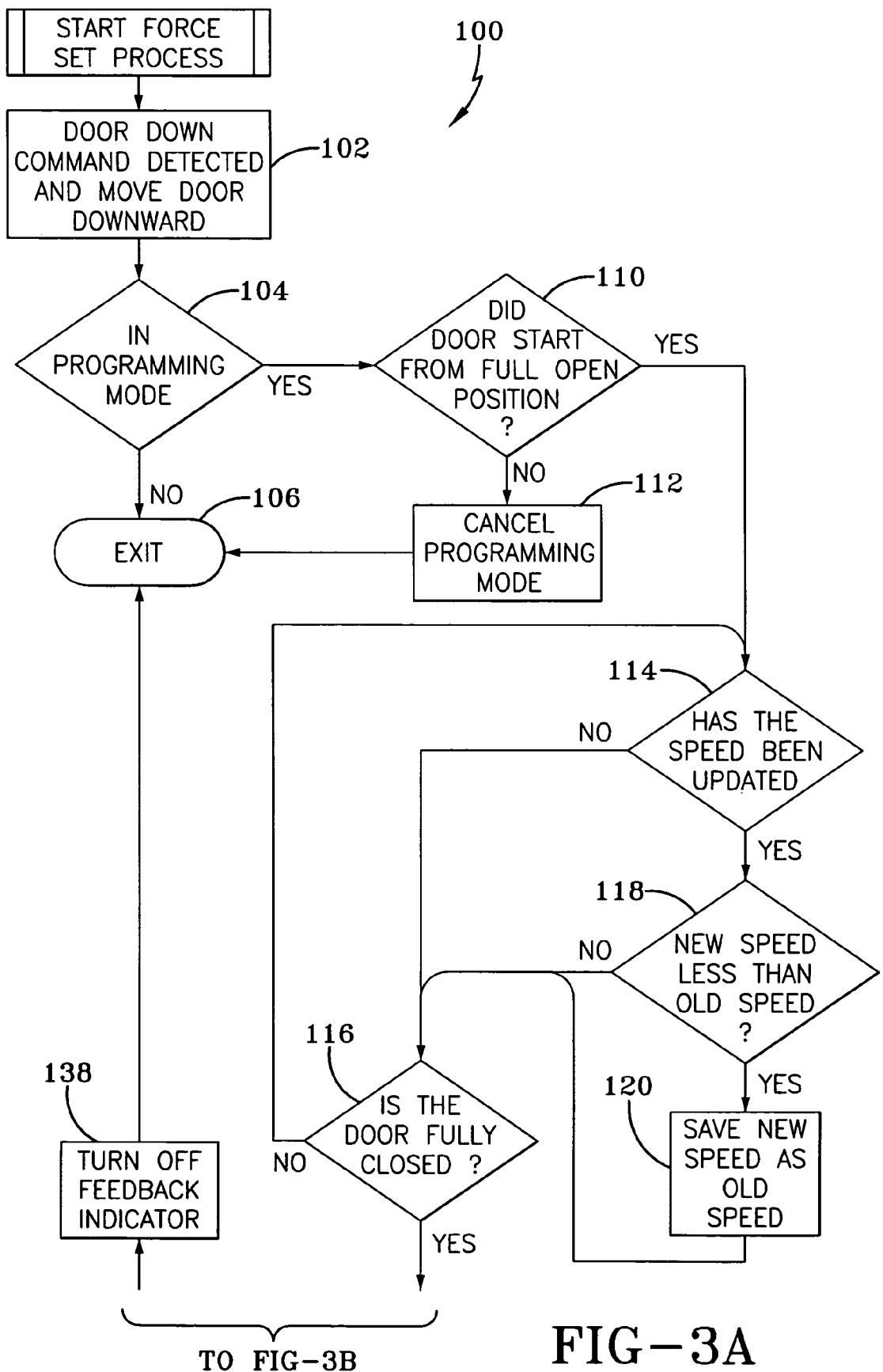
FIGS. 3A and 3B show an operational flow chart employed by operator of the present invention for setting a minimum force to move a barrier.
Figure 3B:
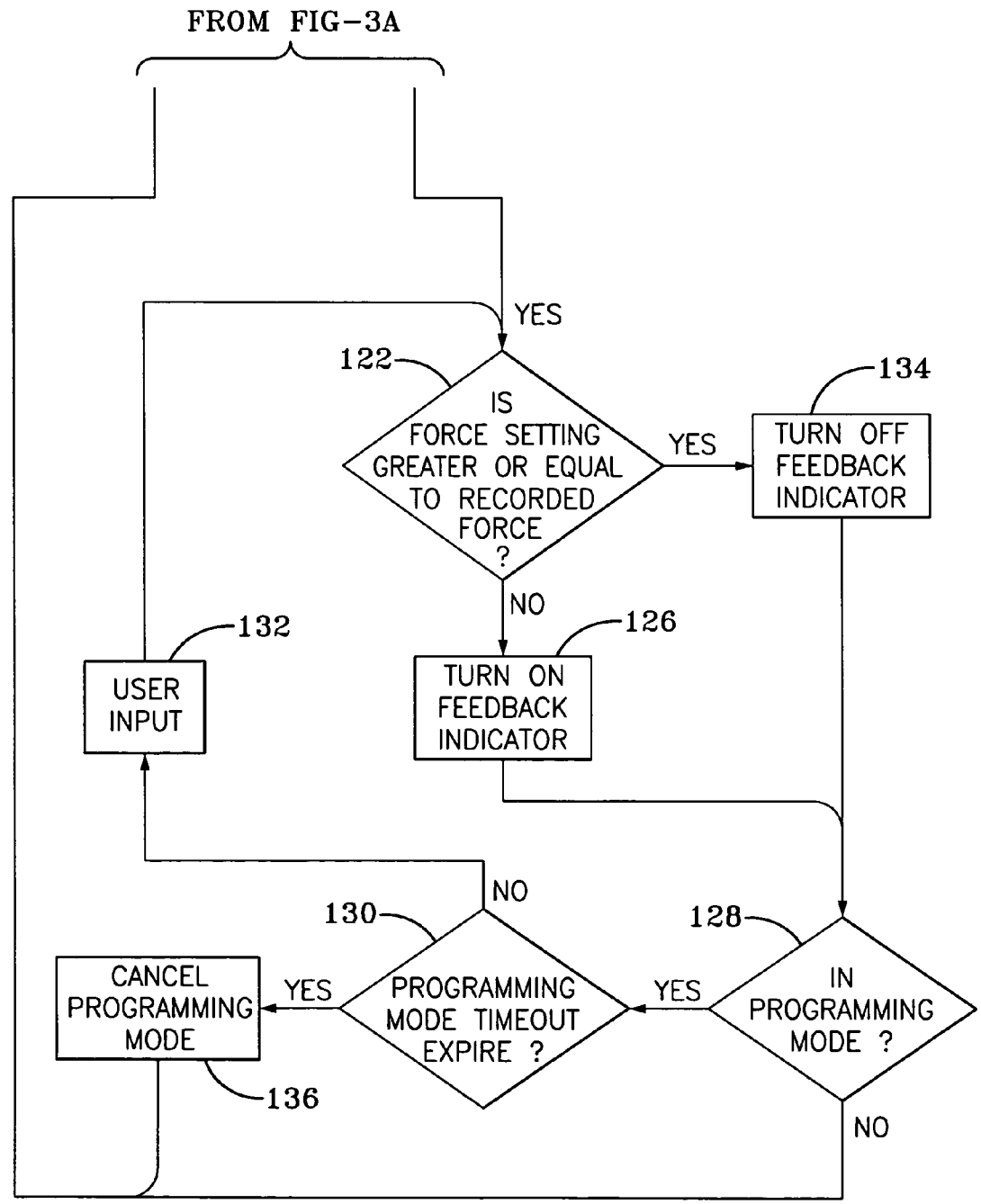

Referring now to FIGS. 3A and 3B, it can be seen that a methodology is designated generally by the numeral 100 for the purpose of determining an optimal force setting in a downward barrier direction. As an initial matter it will be appreciated that the methodology described herein utilizes a controller such that any time after the door is installed and a programming mode is entered, the motorized operator moves the door to a fully open position and a manual force adjustment is to be set to the minimum force setting. This minimum force setting is used as an additional safety precaution such that any recorded force will very likely need to be greater than the minimum force setting. For example, the minimum force setting in the preferred embodiment is about 15 in-lb. of torque.

At a first step 102, a door down command is detected by the controller 52. This command may be initiated by any one of the transmitters 40, 42 or 44. Next, at step 104 the controller determines whether the programming mode is in place which is initiated by actuation of the button 70 or otherwise. A timer, which is maintained by the controller, is started at step 104. If the programming mode is not active, then the process exits at step 106.

If the programming mode is entered at step 104, then at step 110, the controller determines as to whether the door has started from a full open position or not. If the door has not started from a full open position then the process continues to step 112 where the programming mode is cancelled and then the process is exited. This is done to ensure that a complete set of data is used for determining the recorded force for the entire door closure. Otherwise, an improper force setting may be realized.

Returning now to step 110 if it is determined that the door is starting from a full open position, then the process continues to step 114 to determine whether the stored speed value of the door has been updated or not. If the speed value has not been updated, then the process continues to step 116 to determine whether the door has fully closed or not. If the door has not yet fully closed then the process returns to step 114.

If at step 114 it is determined that the speed value has been updated, then the process continues to step 118 to determine whether the new speed value is less than the speed value detected during the door travel from the full open to full close position by any one of the sensors 62 or 64 and stored in the memory device. In this manner, the slowest door speed is always determined and stored. Accordingly, if at step 118 the "new speed" is slower than the "old speed," then at step 120, the new slower speed is saved as the "old speed." Upon completion of steps 118 and 120, and upon the door fully closing as detected at step 116, the process continues on to step 122.

Based upon the speed valued detected by any one of the sensors associated with the drive shaft, the barrier, the motor or any other type of sensor associated with the barrier operator system that detects door speed, the controller 52 inquires as to whether the force setting, which was initially set to minimal value, is greater or equal to the recorded force at step 122. In other words, the initial force setting is compared to the recorded force value that is derived from the "old speed" established at step 120. Initially, the initial force setting is set at the factory to be a minimum value that is less than any possible recorded force. As such, at step 126, the feedback indicator, which may either be the light 76 or the speaker 78, is placed in an on condition. Next, at step 128, the controller confirms that the programming mode is still enabled and if so then the process continues to step 132 to determine whether the programming mode time out has yet expired or not. This time period allows the user sufficient time to set the manual adjustment. If at step 130, a timer, which was started at step 104, has not expired then the user is allowed to provide input by rotating the potentiometer 74 at step 132 so as to increase the force setting. If desired, the program mode may be exited by activating the program button again or by a control action such as pressing of a remote transmitter button. The methodology then returns to step 122 to re-analyze whether the force setting is greater or equal to the recorded force. Once the user moves the force setting to a value greater or equal to the recorded force, then at step 134 the feedback indicator, which is the either the light 76 or the speaker 78, turns the feedback indicator to an off condition. The process then proceeds onto step 128 for repeating of that step and if the programming mode is no longer in place, then the feedback indicator is turned off at step 138 and the process exits at step 106. If however, it is determined that the programming mode is still on at step 128, then the controller queries as to whether the timer has expired at step 130. If the time has expired, then the programming mode is cancelled at step 136 and the feedback indicator is turned off at step 138 and the process exits at step 106.

In summary, while in the programming mode of operation, the user commands the door to close. During closing, measurements of the door speed are periodically taken every ten to twenty milliseconds, or by other time periods as deemed appropriate, by means of a sensor device such as the encoder, the potentiometer or other means. The slowest speed of the door, the slowest speed of the motor shaft, the highest motor current or other measured output during this travel period is converted to a force value, recorded and stored into the memory device 54. Upon complete closure of the door the indicator light or other feedback device is enabled or illuminated to provide feedback to the user that the current force setting is too low. Next, the recorded force is continuously compared to the manual force setting using a thirty-two step or other plurality of steps look-up table. As the user rotates the manual force setting device 74, the feedback indicator 76/78 extinguishes at a point where the recorded force is less than or equal to the manual force setting indicating the optimal position for the force adjustment has been obtained. It will be appreciated that this system and related methodology provides for the minimal force setting required to close the door in a safe and reliable manner. Indeed, the force setting allows for clear detection of an obstruction. But in the event an obstruction is detected, the force exerted by the door is such that minimal damage occurs to the obstruction prior to the door's reversal. This is advantageous inasmuch as the user can accurately set the operating force on the door by a visual means or other means that provides positive feedback. This is also advantageous in that the operator system is configurable with any type of weight or size door so that accurate force settings are provided for each configuration. As such, special settings are not required to be established for operators knowing that they will be installed with different sizes and types of doors or moveable barriers.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A method for setting a force adjustment on a barrier operator, wherein the barrier operator initiates corrective action if a detected obstruction force is deemed excessive, the method comprising:
   pre-setting a force threshold value used by the barrier operator;
   initiating a programming mode;
   moving the barrier from one limit position to another limit position while in said programming mode;
   determining a recorded value during the moving step;
   adjusting said force threshold value until equal to said recorded value;
   associating a sensory feedback device with said threshold value;
   enabling said sensory feedback device while in said programming mode; and
   disabling said sensory feedback device when said threshold value is equal to or greater than said recorded value.

2. The method according to claim 1, further comprising:
   illuminating a light when said sensory feedback device is enabled; and
   turning said light off when said sensory feedback device is disabled.

3. The method according to claim 1, further comprising:
   energizing a speaker when said sensory feedback device is enabled; and
   turning said speaker off when said sensory feedback device is disabled.

4. The method according to claim 1, further comprising:
   starting a timer at said initiating step; and
   allowing performance of said adjusting step while said timer is active.

5. The method according to claim 1, further comprising:
   performing said determining step only when said moving step is complete.

6. The method according to claim 1, further comprising:
   detecting and storing a speed value of the barrier during said moving step; and
   updating said speed value if a new speed value is detected that is less than an old speed value previously stored.

7. The method according to claim 6, further comprising:
   re-determining said recorded value based upon said updated speed value.

8. The method according to claim 7, further comprising:
   re-adjusting said threshold value based upon said re-determined recorded value.

9. A barrier operator system that provides a force setting adjustment comprising:
   a moveable barrier;
   a motor coupled to said moveable barrier, said motor moving said barrier between limit positions;
   a sensor associated with one of said moveable barrier and said motor to determine a recorded value of barrier movement; and
   an adjustment mechanism that allows adjustment of a threshold value from a pre-set minimal value until at least equal said recorded value;
   a sensory feedback device associated with said adjustment mechanism so as to provide an indication as to when said threshold value is at least greater than or equal to said recorded value;
   a controller connected to said sensory feedback device and to said adjustment mechanism, wherein said controller controls said motor and the position of said moveable barrier, said controller receiving a new speed value from said sensor and generating said recorded value therefrom; and
   wherein said sensory feedback device is enabled when said controller is in a programming mode, and wherein said sensory feedback device is disabled in said programming mode when said threshold is equal to or greater than said recorded force value.

10. The system according to claim 9, further comprising:
    a program button connected to said controller, wherein actuation of said program button causes said controller to enter said programming mode and movement of said moveable barrier from an open position to a close position during said programming mode enables generation of said recorded value.

11. The system according to claim 10, further comprising:
    a light that is illuminated when said sensory feedback device is enabled, and wherein said light is disabled when said sensory feedback device is disabled.

12. The system according to claim 10, further comprising:
    a speaker that generates a recognizable sound when said sensory feedback device is enabled, and wherein said speaker is disabled when said sensory feedback device is disabled.

13. The system according to claim 10, further comprising:
    a timer associated with said controller, wherein said timer is started upon actuation of said program button and wherein expiration of said timer causes said program mode to exit.

* * * * *